United States Patent
Ueda et al.

(10) Patent No.: US 9,061,365 B2
(45) Date of Patent: Jun. 23, 2015

(54) PULSE ARC WELDING METHOD

(75) Inventors: Yuji Ueda, Osaka (JP); Toshiro Uezono, Osaka (JP)

(73) Assignee: DAIHEN Corporation, Osaka (JP)

( * ) Notice: Subject to any disclaimer, the term of this patent is extended or adjusted under 35 U.S.C. 154(b) by 1152 days.

(21) Appl. No.: 12/220,193

(22) Filed: Jul. 22, 2008

(65) Prior Publication Data

US 2009/0026186 A1  Jan. 29, 2009

(30) Foreign Application Priority Data

Jul. 23, 2007  (JP) ................. 2007-190458
Feb. 1, 2008  (JP) ................. 2008-22251

(51) Int. Cl.
*B23K 9/09* (2006.01)
(52) U.S. Cl.
CPC ................... *B23K 9/092* (2013.01)
(58) Field of Classification Search
USPC ............ 219/130.21, 130.31, 130.32, 130.33, 219/130.51, 137 PS
See application file for complete search history.

(56) References Cited

U.S. PATENT DOCUMENTS

| | | | |
|---|---|---|---|
| 5,834,732 A * | 11/1998 | Innami et al. ............ | 219/130.51 |
| 6,025,573 A * | 2/2000 | Stava ...................... | 219/130.21 |
| 2002/0030043 A1* | 3/2002 | Tong ...................... | 219/137 PS |
| 2005/0056630 A1* | 3/2005 | Tong ...................... | 219/130.51 |
| 2005/0269306 A1* | 12/2005 | Fulmer et al. ............ | 219/130.51 |
| 2008/0087654 A1* | 4/2008 | Fulmer et al. ............ | 219/130.51 |

FOREIGN PATENT DOCUMENTS

| | | |
|---|---|---|
| DE | 198 08 383 | 9/1999 |
| EP | 0 715 921 | 6/1996 |
| EP | 1 193 019 | 4/2002 |
| JP | 2005-28383 | 2/2005 |
| JP | 2005-118872 | 5/2005 |
| JP | 2006-75890 | 3/2006 |

\* cited by examiner

*Primary Examiner* — Brian Jennison

(74) *Attorney, Agent, or Firm* — Hamre, Schumann, Mueller & Larson, P.C.

(57) ABSTRACT

In pulse arc welding, a welding wire is fed at a rate corresponding to a current average set value. An arc is struck by passing a peak current for a peak period and a base current for a base period, where the peak and base periods make one pulse period. The arc transfers a droplet from the wire. The peak period includes a first peak period for a first peak current and a second peak period for a smaller second peak current. The first peak period and current are determined so that an arc anode point is formed at the top of the droplet even if the shield gas mixing ratio deviates from a standard value. The second peak period and current are determined so that one droplet is transferred during every pulse period, and beads are formed with no undercuts.

9 Claims, 5 Drawing Sheets

PULSE ARC WELDING METHOD

BACKGROUND OF THE INVENTION

1. Field of the Invention

The present invention relates to a pulse arc welding method configured to ensure stable welding even if the mixing ratio of the shield gas is changed.

2. Description of the Related Art

FIG. 5 shows examples of the waveforms of welding current Iw (waveform A) and welding voltage Vw (waveform B) applied in a conventional consumable electrode pulse arc welding. As seen from the waveform A, during the peak rising period Tup (time t1-t2), transition current will flow, which rises from the base current Ib to the peak current Ip. During the same period, as seen from the waveform B, transition voltage, which rises from the base voltage Vb to the peak voltage Vp, will be applied between the welding wire and the base metal. During the peak period Tp (time t2-t3), the peak current Ip flows as shown in the waveform A, and the peak voltage Vp is applied as shown in the waveform B. During the peak falling period Tdw (time t3-t4), transition current reducing from the peak current Ip to the base current Ib will flow, and transition voltage reducing from the peak voltage Vp to the base voltage Vb will be applied. During the base period Tb (time t4-t5), base current Ib whose value is small enough not to grow droplets will flow, while base voltage Vb will be applied. The period from t1 to t5 is a pulse period Tf.

The lengths of the peak rising period Tup and the peak falling period Tdw are determined properly, depending on the material of the base metal. In the pulse MAG welding where the base metal is steel, the two periods are set to be so short that the peak current has a rectangular waveform. On the other hand, in the pulse MIG welding where the base metal is aluminum, the two periods are set to be relatively long, so that the peak current has a trapezoidal waveform. The transition current mentioned above is increased and decreased linearly. Alternatively, the transition current may be varied in a curved manner to improve the weldability, as disclosed in JP-A-2005-28383 or JP-A-2006-75890. Also, the peak current Ip may be increased stepwise, as disclosed in JP-A-2005-118872, for example. For the shield gas, use may be made of a mixture of 80% argon gas and 20% carbonic acid gas for the pulse MAG welding, or 100% argon gas for the pulse MIG welding.

In the consumable electrode arc welding, it is important to control the arc length for obtaining good welding quality. As known in the art, the average Vav of the welding voltage Vw is generally proportional to the length of an arc. Based on this fact, the control of the arc length is performed by controlling the output of the welding power source so that the welding voltage average Vav becomes equal to a predetermined voltage set value. Likewise, in the pulse arc welding, the output control of the welding power source is performed by controlling the pulse period Tf so that the welding voltage average Vav becomes equal to a voltage set value (Frequency Modulation Control). In a different way, while the pulse period Tf is kept constant, the peak period Tp is varied for performing the output control of the welding power source (Pulse Width Modulation Control).

FIG. 6 shows a "1 pulse-1 droplet" transfer range, used for setting the peak period Tp and the peak current Ip. In the figure, the horizontal axis represents the length of the peak period Tp (in milliseconds), while the vertical axis represents the peak current Ip (in amps). The shaded part shows the so-called "1 pulse-1 droplet transfer range" in which only one droplet is transferred in synchronism with the pulse period Tf.

When a combination of the peak period Tf and the peak current Ip (called the "unit pulse condition") is within the shaded range, the 1 pulse-1 droplet transfer occurs. The unit pulse condition should be within the 1 pulse-1 droplet transfer range and selected for producing good bead results (with fine appearance and no undercuts). In an instance where the peak current Ip is not constant, an integrated value of the peak current Ip over the peak period Tp is calculated, and the two parameters are adjusted so that the current integration value falls within an appropriate range corresponding to the shaded range. The 1 pulse-1 droplet transfer range will vary depending on factors such as the kind of the welding wire, the mixing ratio of the shield gas, the wire feeding speed, etc. Therefore, in accordance with the change of these factors, the unit pulse condition should be readjusted.

FIG. 7 illustrates the occurrence of an arc when the unit pulse condition is within the 1 pulse-1 droplet transfer range. Specifically, an arc 3 strikes between the base metal 2 and the tip of the welding wire 1 sent out from the welding torch 4. On the base metal 2, a molten pool 2a is formed. An arc anode point is formed above the molten part 1a at the tip of the wire. Thus, the molten part 1a is wrapped up with the arc 3. On the other hand, the arc cathode point 3b is formed on the molten pool 2a. Immediately after the ending of the passage of the peak current Ip, the transfer of a free molten droplet 1b occurs.

The setting of the unit pulse condition described above is performed on the assumption that the mixing ratio of the shield gas is a standard ratio. For example, in the pulse MAG welding with a steel base metal, the shield gas is a mixture of argon gas and carbonic acid gas. In Japan, the standard ratio in this case is 80% argon gas and 20% carbonic acid gas.

When a gas container properly adjusted to the standard ratio is used for supplying the shield gas, the welding can be performed with substantially no variation in the mixing ratio of the shield gas. However, in a large-scale factory, the argon gas and the carbonic acid gas may often be stored in separate tanks, and the two gases are mixed when needed to be supplied to a welding apparatus. In such a case, the mixing ratio of the shield gas tends to fluctuate in an early stage of the beginning of the factory operation until it becomes stable. This fluctuation can be as great as ±5 to ±10%, depending on the feeding systems of the shield gas. Further, in addition to the fluctuation in the early stage, there can be some minor fluctuation even in a stable stage, which may be no greater than about ±5%.

There is a case where the mixing ratio of the shield gas should be precisely adjusted in performing welding in light of the shape of the work or required welding quality. For such high quality welding, the standard ratio of the shield gas is set by increasing or decreasing the ratio of the argon gas. As known in the art, the arc condition is often kept stable when the ratio of the argon gas in the shield gas is increased. This is because the increase of the argon gas ratio facilitates the transfer of a molten droplet. Therefore, it is often unnecessary to reset the unit pulse condition when the ratio of argon gas is increased.

On the other hand, when the argon gas ratio decreases in the shield gas, the transfer of a droplet occurs less easily, thereby making the arc condition unstable. This phenomenon will be described below with reference to FIG. 8.

FIG. 8 illustrates the condition of the arc striking portion in an instance where the argon gas ratio of the shield gas is decreased from the standard value. Specifically, as shown in FIG. 8(A), when the argon gas ratio is reduced, the arc anode point 3a is formed at the bottom of the molten wire 1a. In this case, the neighborhood of the arc anode point 3a becomes very hot, thereby causing metal vapor 5 to gush downward from the bottom of the molten wire 1a, as shown in FIG. 8(B). As a result, the arc anode point 3a is urged upward by force 6 from the metal vapor 5, making the droplet transfer unstable. Then, with the droplet transfer prevented from occurring, the molten portion at the tip of the welding wire becomes bigger, as shown in FIG. 8(C), and a lot of sputter 7 will be produced, scattering in undesired directions.

One way to address the above-described inconvenience is to increase the peak current Ip for shifting the arc anode point 3a upward from the bottom of the molten wire 1a. However, by increasing the peak current Ip, the arc 3 flares out and the arcing strength becomes greater. As a result, more undercuts are formed, and less beads with good appearance are obtained. In addition, more sputtering will occur due to the increase of the arcing strength.

SUMMARY OF THE INVENTION

The present invention has been proposed under the circumstances described above. Therefore, it is an object of the present invention to provide a pulse arc welding method whereby the arc is kept stable even if the mixing ratio of the shield gas is changed.

According to the present invention, there is provided a pulse arc welding method comprising the steps of: feeding a welding wire at a wire feeding rate corresponding to a predetermined welding current average set value; striking an arc by repeating application of a peak current for a peak period and a base current for a base period, the peak period and the base period making one pulse period; and welding by causing the arc to transfer a droplet from the welding wire. In this method, the peak period comprises a first peak period for applying a first peak current and a second peak period for applying a second peak current, where the second peak current has a smaller value than the first peak current. The first peak period and the first peak current are determined so that an arc anode point is formed at an upper portion of the droplet even if the mixing ratio of a shield gas deviates from a standard value within a predetermined tolerance. The second peak period and the second peak current are determined so that one droplet is transferred during every pulse period and beads are formed with no undercuts.

Preferably, the first peak period and the first peak current may be adjusted in accordance with the change of the standard value.

Preferably, the difference between the first peak current and the second peak current may be reduced as the welding current average set value becomes greater.

Preferably, the above reduction of the difference may be performed only when the welding current average set value is greater than a critical current value.

Other features and advantages of the present invention will become apparent from the detailed description given below with reference to the accompanying drawings.

THE DETAILED DESCRIPTION OF THE PREFERRED EMBODIMENTS

The preferred embodiment of the present invention will be described below with reference to the accompanying drawings.

Figure 1:
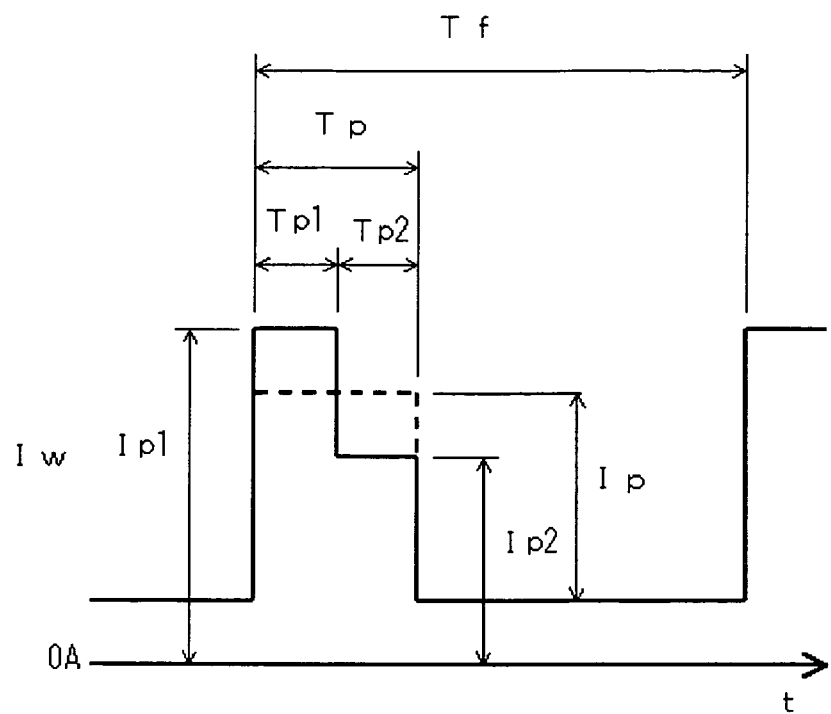
FIG. 1 shows the waveform of welding current Iw used in a pulse arc welding method according to the present invention.

FIG. 1 shows the waveform of a welding current Iw applied in a pulse arc welding method according to the present invention. As shown in the figure, the peak period Tp comprises two periods, that is, a first peak period Tp1 and a second peak period Tp2. During the first peak period Tp1, a first peak current Ip1 is caused to flow, and during the second peak period Tp2, a second peak current Ip2, which is smaller in the first peak current Ip1, is caused to flow. Thus, the peak current as a whole has a step-like form sloping to the right (in other words, declining with time).

As shown by the dotted line in FIG. 1, the conventional peak current has a constant value Ip through the peak period Tp. The first peak current Ip1 is set to have a greater value than the conventional constant value Ip. As a result of passing such greater first peak current Ip1, an arc anode point is formed at an upper portion of the molten wire (unreleased droplet) even if the mixing ratio of the shield gas is changed (more specifically, the argon ratio of the shield gas is reduced). For forming such an arc anode point, the length of the first peak period Tp1 should be about 0.2-1.0 ms. In addition, the first peak current Ip1 should remain constant over the first peak period Tp1 without sloping to the right.

On the other hand, the second peak current Ip2 during the second peak period Tp2 is set to have a smaller value than both the conventional peak current Ip and the first peak current Ip1. It should be noted here that the arc anode point mentioned above remains at the same upper portion of the molten wire during the second peak period Tp2. This is because the arc anode point has become stable once it is formed. With a greater first peak current Ip1 and a smaller second peak current Ip2 than the conventional peak current Ip, the average of the peak currents Tp1, Tp2 over the entire peak period Tp is equal or generally equal to the conventional peak current Ip. Therefore, the shape and strength of the arc are substantially the same as the conventional ones, whereby beads are produced with a good appearance and no undercuts are formed.

The parameter setting in the present invention is summarized as follows:

(1) The first peak period Tp1 and the first peak current Ip1 are set so that the arc anode point is to be formed at an upper portion of the unreleased droplet (molten wire) even if the mixing ratio of the shield gas is changed within a prescribed tolerance.

(2) The second peak period Tp2 and the second peak current Ip2 are set so that 1 pulse-1 droplet transfer is to occur and proper beads with no undercuts are to be obtained.

Figure 2:
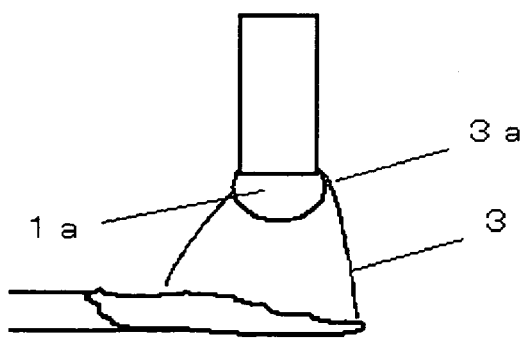
FIG. 2 illustrates the condition of the arc striking portion when the welding current Iw of FIG. 1 is applied.
Figure 8:
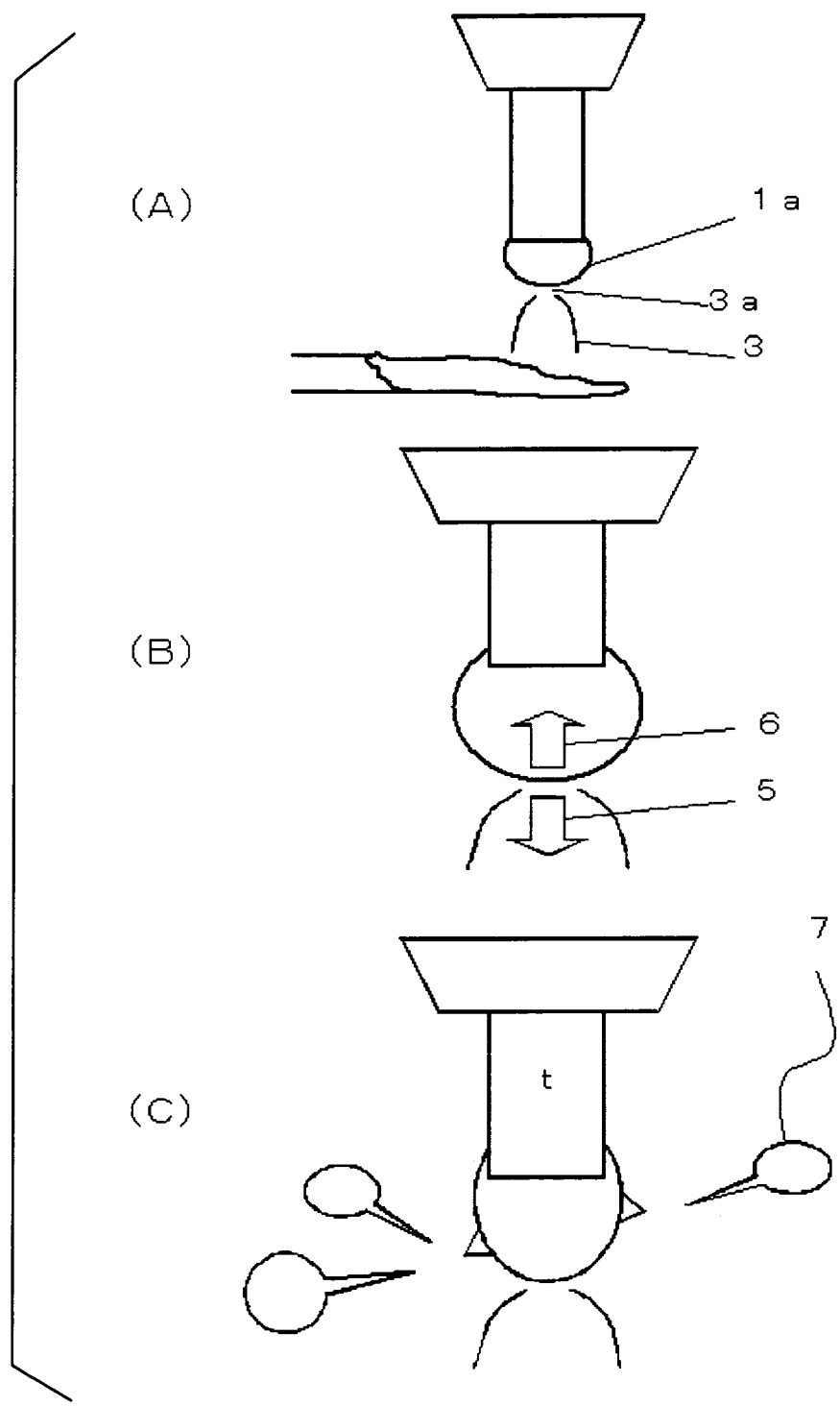
FIG. 8 illustrates the object of the present invention, showing the condition of an arc striking portion when the mixing ratio of the shield gas is changed.

FIG. 2 illustrates the arc striking portion when the stepped peak current (Ip1, Ip2) is applied. As shown in the figure, the arc anode point 3a is formed at the upper portion of the droplet 1a, even if the mixing ratio of the shield gas is changed. In this condition, no upward force 6 (see FIG. 8B) acts on the droplet 1a, and therefore the 1 pulse-1 droplet transfer is facilitated. Accordingly, sputtering occurs less, and proper beads are produced.

Figure 3:
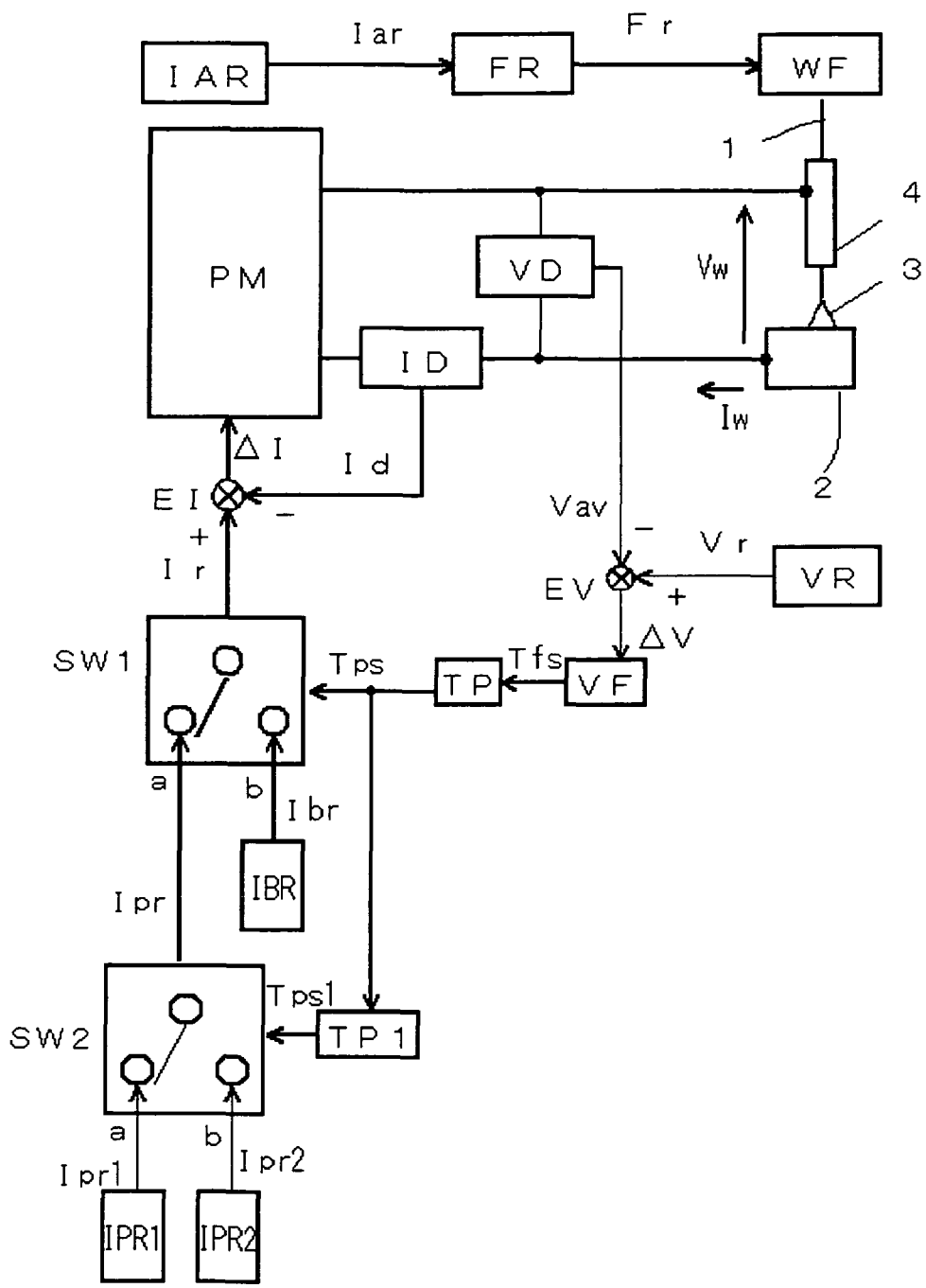
FIG. 3 is a block diagram illustrating the welding power source used in the pulse arc welding method of the present invention.

FIG. 3 is a block diagram of the welding power source used for the pulse arc welding method of the present invention. The components of the power source will be described below by referring to the figure.

Receiving commercially available power of three-phase and 200 V, for example, the main power circuit PM outputs welding voltage Vw and welding current Iw. At this outputting, output control such as inverter control is performed in accordance with a current error amplification signal $\Delta I$ (to be described later). The main power circuit PM comprises a primary rectifier, a smoothing capacitor, an inverter circuit, a high-frequency transformer, a secondary rectifier, a reactor, a modulator, and a driving circuit. Specifically, the primary rectifier rectifies the three-phase, 200 V power inputted to the main power circuit PM. The smoothing capacitor smoothes out the rectified direct current. The inverter circuit converts the smoothed direct current into a high-frequency alternating current. The high-frequency transformer reduces the voltage of the high-frequency alternating current to an appropriate value for the arc welding. The secondary rectifier rectifies the reduced alternating current. The reactor smoothes out the rectified direct current from the secondary rectifier. The modulator performs pulse width modulation control based on the current error amplification signal $\Delta I$ inputted to the main power circuit PM. The driving circuit drives the above inverter circuit based on a signal subjected to the pulse width modulation.

The welding current average setting circuit IAR outputs a welding current average set signal Iar that has been preset. The feeding speed setting circuit FR outputs a wire feeding speed set signal Fr corresponding to the welding current average set signal Iar. The wire feeding machine WF feeds the welding wire 1 at a rate corresponding to the wire feeding speed set signal Fr. The welding wire 1 is supplied through the welding torch 4 by the wire feeding machine WF. After an appropriate length of the welding wire 1 has been projected from the tip of the welding torch 4, an arc 3 is struck between the tip of the welding wire 1 and the base metal 2.

The voltage detection circuit VD detects the welding voltage Vw, calculates the average of the detection results and outputs a voltage detection signal Vav. The voltage setting circuit VR outputs a voltage set signal Vr that has been preset. The voltage error amplifying circuit EV amplifies the difference between the voltage set signal Vr and the voltage detection signal Vav, and outputs a voltage error amplification signal $\Delta V$. The voltage/frequency transformation circuit VF outputs a pulse period signal Tfs based on the voltage error amplification signal $\Delta V$. This pulse period signal Tfs has a frequency corresponding to the voltage error amplification signal $\Delta V$, and turns into a high level for a short time at the beginning of every pulse period Tf (FIG. 1).

The peak period timer circuit TP outputs a peak period signal Tps. This peak period signal Tps becomes high only for the peak period Tp (which is a period of time that begins when the pulse period signal Tfs gets high and lasts for a prescribed length of time). The base current setting circuit IBR outputs a base current set signal Ibr that has been preset. The first switching circuit SW1 is held in contact with the a side when the peak period signal Tps is high (i.e. for the peak period Tp), so that a peak current set signal Ipr (to be described below) is outputted as a current setting signal Ir. When the peak period signal Tps is low (i.e. for the base period), on the other hand, the first switching circuit SW1 turns to the b side to output the base current set signal Ibr as the current set signal Ir.

The first peak period timer circuit TP1 outputs a first peak period signal Tps1. This first peak period signal Tps1 becomes high only for the first peak period Tp1 (which is a period of time that begins when the peak period signal Tps gets high and lasts for a prescribed length of time). The first peak current setting circuit IPR1 outputs a first peak current set signal Ipr1 that has been preset, while the second peak current setting circuit IPR2 outputs a second peak current set signal Ipr2 that has been preset. The second switching circuit SW2 is held in contact with the a side for the first peak period Tp1 (that is, when the first peak period signal Tps1 is high), so that the first peak current set signal Ipr1 is outputted as the peak current set signal Ipr. For the second peak period Tp2 (when the first peak period signal Tps1 is low), on the other hand, the second switching circuit SW2 turns to the b side to output the second peak current set signal Ipr2 as the peak current set signal Ipr.

The current detection circuit ID detects the welding current Iw and outputs a current detection signal Id. The current error amplifying circuit EI amplifies the difference between the current set signal Ir and the current detection signal Id, to output a current error amplification signal $\Delta I$. With all the circuit blocks operating, the above-mentioned welding current Iw 1 (FIG. 1) is applied.

Figure 5:
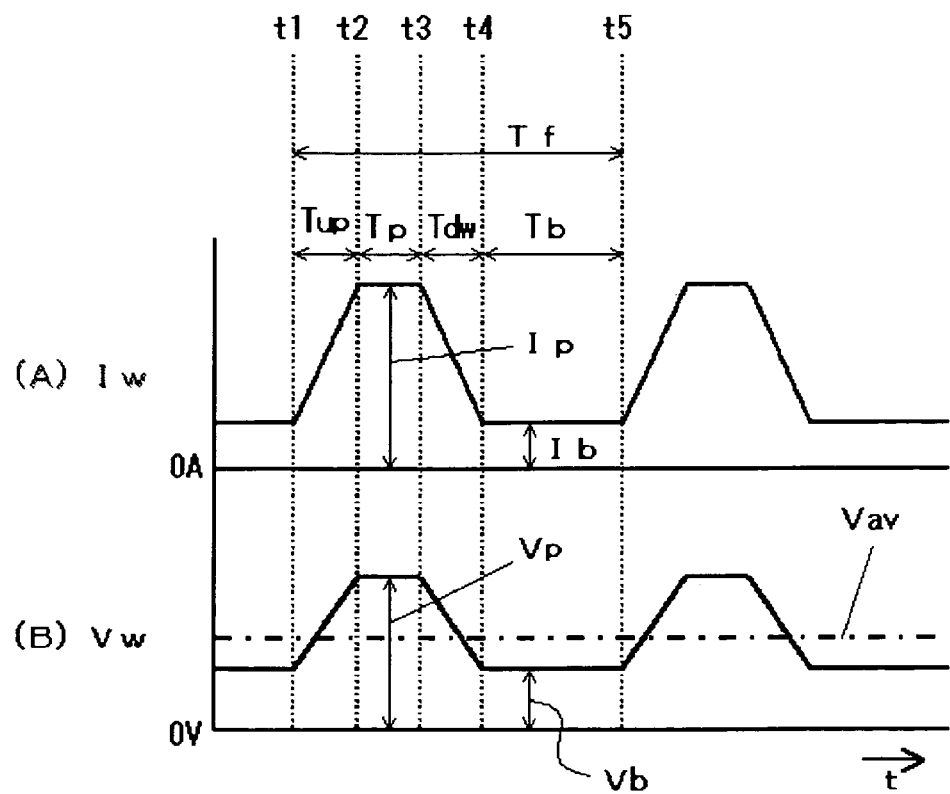
FIG. 5 is a graph showing the waveforms of current and voltage used in a conventional pulse arc welding method.
Figure 6:
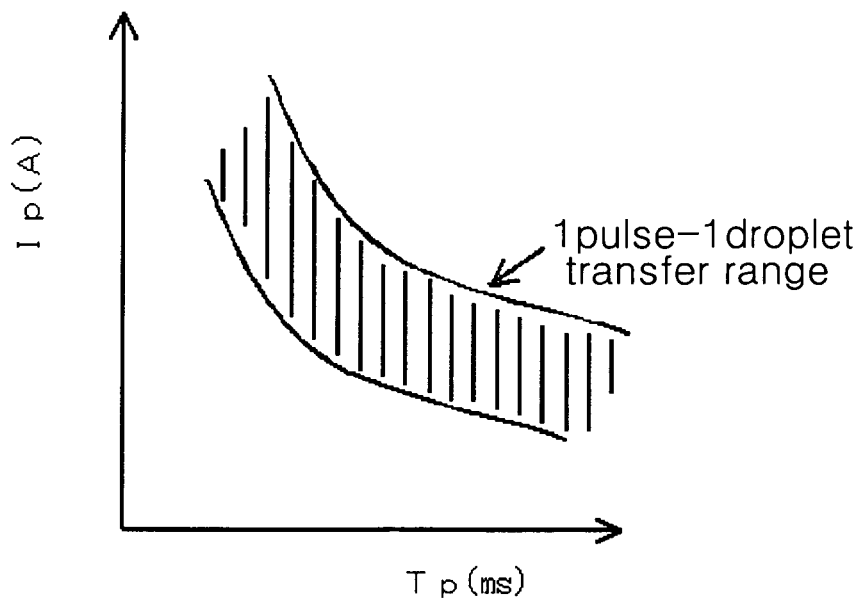
FIG. 6 a unit pulse condition graph showing a 1 pulse-1 droplet transfer range.
Figure 7:
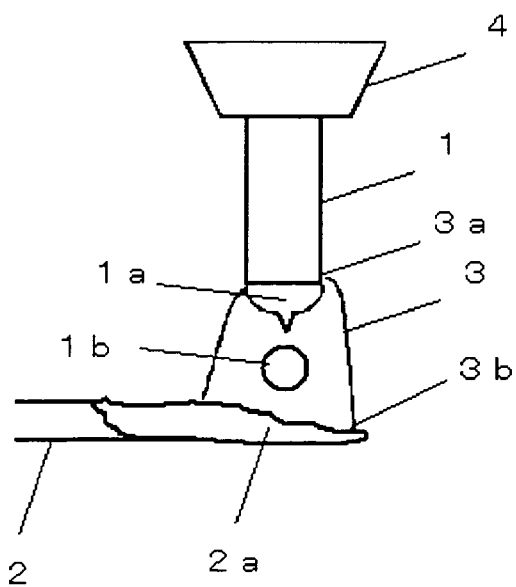
FIG. 7 illustrates an arc striking portion in the conventional pulse arc welding method.

As seen from the graph shown in FIG. 1, the peak rising period (Tup) and the peak falling period (Tdw) are very short (compared with the case shown in FIG. 5). However, the present invention is also applicable to a case where the peak rising period (Tup) and the peak falling period (Tdw) are relatively long. Also, as noted above, the pulse MAG welding for steel material, the standard ratio of the shield gas is 80% argon gas and 20% carbonic acid gas. According to the above embodiment, even if the mixing ratio of the shield gas deviates from the standard ratio within a certain tolerance, the arc remains stable. However, when the standard ratio of the shield gas varies greatly, it is desirable to reset the first peak period Tp1 and the first peak current Ip1 in accordance with the change of the standard ratio. In this manner, a bigger variation in the mixing ratio can be properly coped with. The present invention is applicable not only to the direct current pulse arc welding described above, but also to alternating current pulse arc welding. For the above embodiment, frequency modulation control is described, in which the pulse period is subjected to feed-back control for controlling the arc length. The present invention is also applicable to an instance where pulse width modulation control is performed.

Figure 4:
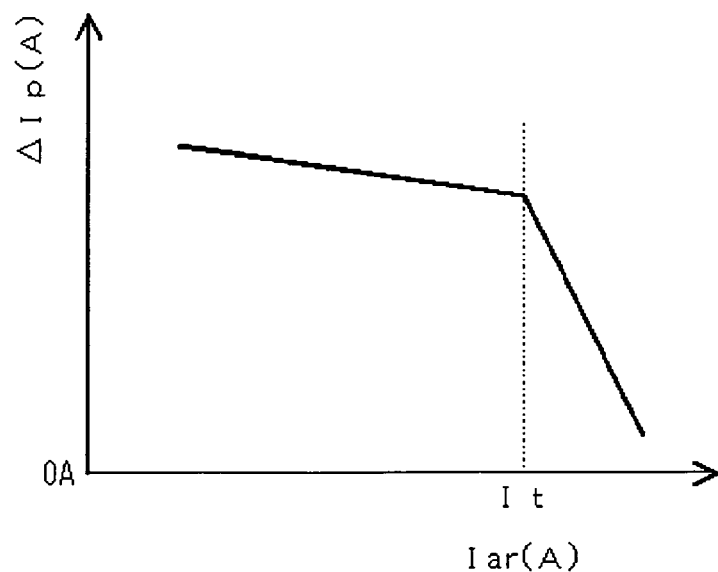
FIG. 4 is a graph showing the relation between the welding current average set value Iar and the peak current difference ΔIp in the pulse arc welding method of the present invention.

FIG. 4 shows the relation between the welding current average set value Iar and the peak current difference $\Delta Ip$. As noted above, the welding current average set value Iar is the signal for setting the average of the welding current Iw, and the welding wire is fed at the rate corresponding to the value Iar. The peak current difference $\Delta Ip$ is the difference between the first peak current Ip1 and the second peak current Ip2, that is, $\Delta Ip = Ip1 - Ip2$.

As shown in FIG. 4, as the welding current average set value Iar becomes greater, the peak current difference $\Delta Ip$ becomes smaller. In particular, beyond the critical current value It (at which droplet transfer changes into spray transfer), the peak current difference $\Delta Ip$ reduces sharply. Thus, for improving the welding quality, the first peak current Ip1 and the second peak current Ip2 should be determined so that the peak current difference ΔIp varies in accordance with the welding current average set value Iar in the manner shown in FIG. 4.

More specifically, in a heavy-current area and when the peak current difference ΔIp is large, defective welding such as humping is more liable to occur as the welding current average becomes greater (and hence the strength of the arc acting on the molten pool becomes greater). In particular, such defectiveness can become more conspicuous when the welding current average is greater than the critical current value It. On the other hand, by reducing the peak current difference ΔIp as the welding current average becomes greater, the arc anode point is formed at an upper portion of the droplet, even if the mixing ratio of the shield gas is changed. In particular, in an instance where the welding current average is greater than the critical current value It, the arc anode point can be formed at an upper portion of the droplet, even with respect to a relatively small peak current difference ΔIp. Therefore, by setting the peak current difference ΔIp to a smaller value as the welding current average becomes greater, the arc anode point can be formed at an upper portion of the droplet, and the strength of the arc acting on the molten pool can be prevented from becoming unduly strong. As a result, defective welding such as burn-through and humping will not occur. As noted above, defective welding is more likely to occur when the welding current average is greater than the critical current value It. Thus, the peak current difference ΔIp may be reduced only when the welding current average is greater than the critical current value It. In other words, when the welding current average is smaller than the critical current value It, the adjustment of the peak current difference ΔIp may not be performed.

According to the present invention, as described above, it is possible to form an arc anode point at an upper portion of the droplet and to prevent the flaring of the arc and increase of the arcing strength, even if the mixing ratio of the shield gas deviates from the standard value within a predetermined tolerance. Accordingly, 1 pulse-1 droplet transfer can be performed and no undercuts are produced, whereby the arc remains stable and a good welding quality will result. Further, by adjusting the first peak period and the first peak current in accordance with the standard mixing ratio of the shield gas, the above advantages can be enjoyed even if the mixing ratio of the shield gas greatly varies. Still further, by setting the peak current difference to a smaller value as the welding current average becomes greater, the strength of the arc acting on the molten pool is prevented from becoming unduly strong, whereby defective welding such as burn-through and humping will not occur. This advantageous feature is more conspicuous when the welding current average is greater than the critical current value.

The invention claimed is:

1. A pulse arc welding method comprising the steps of:
    setting a predetermined welding current average set value;
    feeding a welding wire toward a work at a wire feeding rate corresponding to the welding current average set value;
    striking an arc by repeating application of a peak current for a peak period and a base current for a base period, the peak period and the base period form one pulse period, and the predetermined welding current average set value remains constant over at least the one pulse period; and welding by causing the arc to transfer a droplet from the welding wire to the work;
    wherein the peak period comprises a first peak period for applying a first peak current and a second peak period for applying a second peak current, the second peak current having a smaller value than the first peak current so that the peak current has a step-like form, the base current is less than the first peak current and the second peak current, an average of the first peak current and the second peak current over the entire peak period is equal to or generally equal to a conventional peak current, the first peak current is greater than the conventional peak current, the second peak current is less than the conventional peak current, the droplet being held in direct contact with the welding wire during the first peak period and at least part of the second peak period, the second peak period starting before the droplet comes into contact with the work,
    wherein the first peak period and the first peak current are determined so that an arc anode point is formed at an upper portion of the droplet even if a mixing ratio of a shield gas deviates from a standard value,
    wherein the second peak period and the second peak current are determined so that one droplet is transferred during every pulse period and beads are formed with no undercuts,
    wherein a difference between the conventional peak current and the second peak current is smaller than a difference between the second peak current and the base current.

2. The pulse arc welding method according to claim 1, wherein the first peak current and the second peak current remain constant during the first peak period and the second peak period, respectively.

3. The pulse arc welding method according to claim 1, wherein the arc anode point formed at the upper portion of the droplet during the first peak period causes the droplet to be covered substantially entirely with the arc.

4. The pulse arc welding method according to claim 1, wherein the base current remains constant during the base period.

5. The pulse arc welding method according to claim 1, wherein a difference between the first peak current and the second peak current is reduced as the welding current average set value becomes greater.

6. The pulse arc welding method according to claim 1, wherein the shield gas is made up of argon gas and carbonic acid gas.

7. The pulse arc welding method according to claim 5, wherein the first peak period and the first peak current are adjusted in accordance with a change of the standard value.

8. The pulse arc welding method according to claim 7, wherein the reduction of the difference is performed only when the welding current average set value is greater than a critical current value.

9. The pulse arc welding method according to claim 5, wherein the reduction of the difference is performed only when the welding current average set value is greater than a critical current value.

* * * * *